June 30, 1959 W. H. LYON 2,892,901
LONG TIME RECORDER HAVING FIXED TRANSDUCER HEADS
AND YIELDABLE TAPE PRESSURE SHOE
Filed Oct. 2, 1956 2 Sheets-Sheet 1

INVENTOR.
WILLIAM H. LYON
BY
H. G. Manning
ATTORNEY

June 30, 1959 W. H. LYON 2,892,901

LONG TIME RECORDER HAVING FIXED TRANSDUCER HEADS AND YIELDABLE TAPE PRESSURE SHOE

Filed Oct. 2, 1956 2 Sheets-Sheet 2

INVENTOR.
WILLIAM H. LYON
BY
H. G. Manning
ATTORNEY

United States Patent Office 2,892,901

Patented June 30, 1959

2,892,901

LONG TIME RECORDER HAVING FIXED TRANSDUCER HEADS AND YIELDABLE TAPE PRESSURE SHOE

William H. Lyon, Orange, Conn., assignor to The Soundscriber Corporation, New Haven, Conn., a corporation of Connecticut Application October 2, 1956, Serial No. 613,455

7 Claims. (Cl. 179—100.2)

Figure 1:
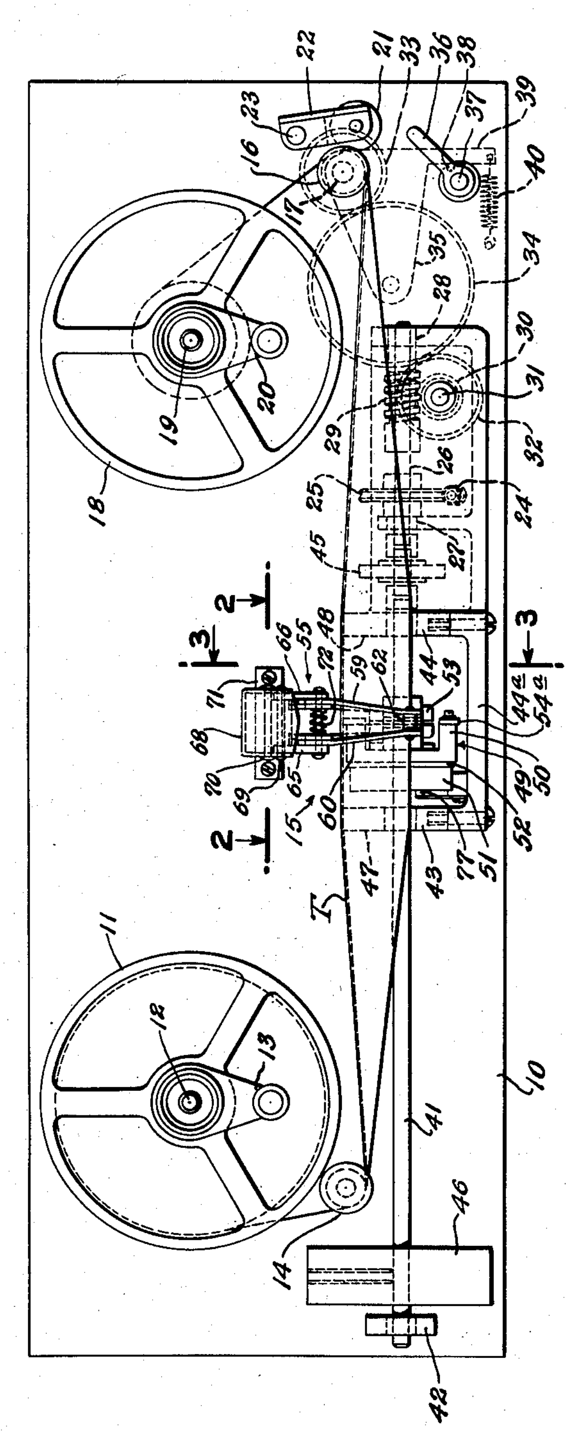

This invention relates to apparatus for recording and reproducing intelligence on magnetic strip or tape material and more particularly to recording and reproducing apparatus wherein a plurality of magnetic transducer heads are mounted for rotation in a circular path transverse to the direction of movement of the tape, whereby such intelligence is recorded on the tape in a series of interrupted parallel spaced paths, disposed transversely with respect to the length of the tape.

One object of this invention is to provide an apparatus of the above nature in which the magnetic tape is held firmly in a semi-cylindrical cross-sectional configuration during its lengthwise movement with respect to the rotating transducer means, and in which the transducer means is provided with non-yieldable heads and a yieldable two-part tape pressure shoe operative to cause said tape to conform to the paths of the non-yielding heads at all times during their sweep across the width of the tape.

Another object is to provide an apparatus of the above nature wherein the yieldbale tape pressure shoe means maintains constant pressure at all times between a transducer head and the tape during the passage of the head across the tape.

Another object is to provide an apparatus of the above nature which will obviate wrinkling of the magnetic tape material caused by the pressure exerted by the pole piece of the transducer head, or by the misalignment of the tape with respect to said head.

Still another object is to provide an apparatus of the above nature wherein the magnetic tape will be held in continuous contact with a rotating transducer head as it moves in a circular path, regardless of wear of the head on its support.

A further object is to provide an apparatus of the above nature wherein means is provided for automatically compensating for changes in dimensions of transducer pole pieces caused by normal wear.

Still another object is to provide an improved apparatus for recording and reproducing with longitudinally moving magnetic tape, wherein said tape is confined in an arcuate cross-section for operative engagement with the successive transversely movable magnetic transducer means, and wherein only a single pair of said transducer means will be required to record or reproduce an uninterrupted signal with said magnetic tape.

A further object is to provide an apparatus of the above nature in which the tape will have uniform flexibility at all points of contact with the transducer heads, irrespective of variations in the width of said tape.

A still further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

Figure 4:
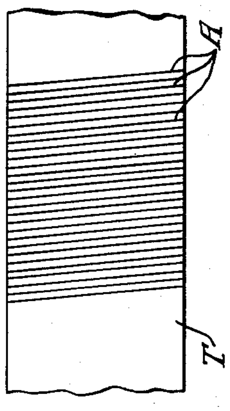
Figures 2, 3:
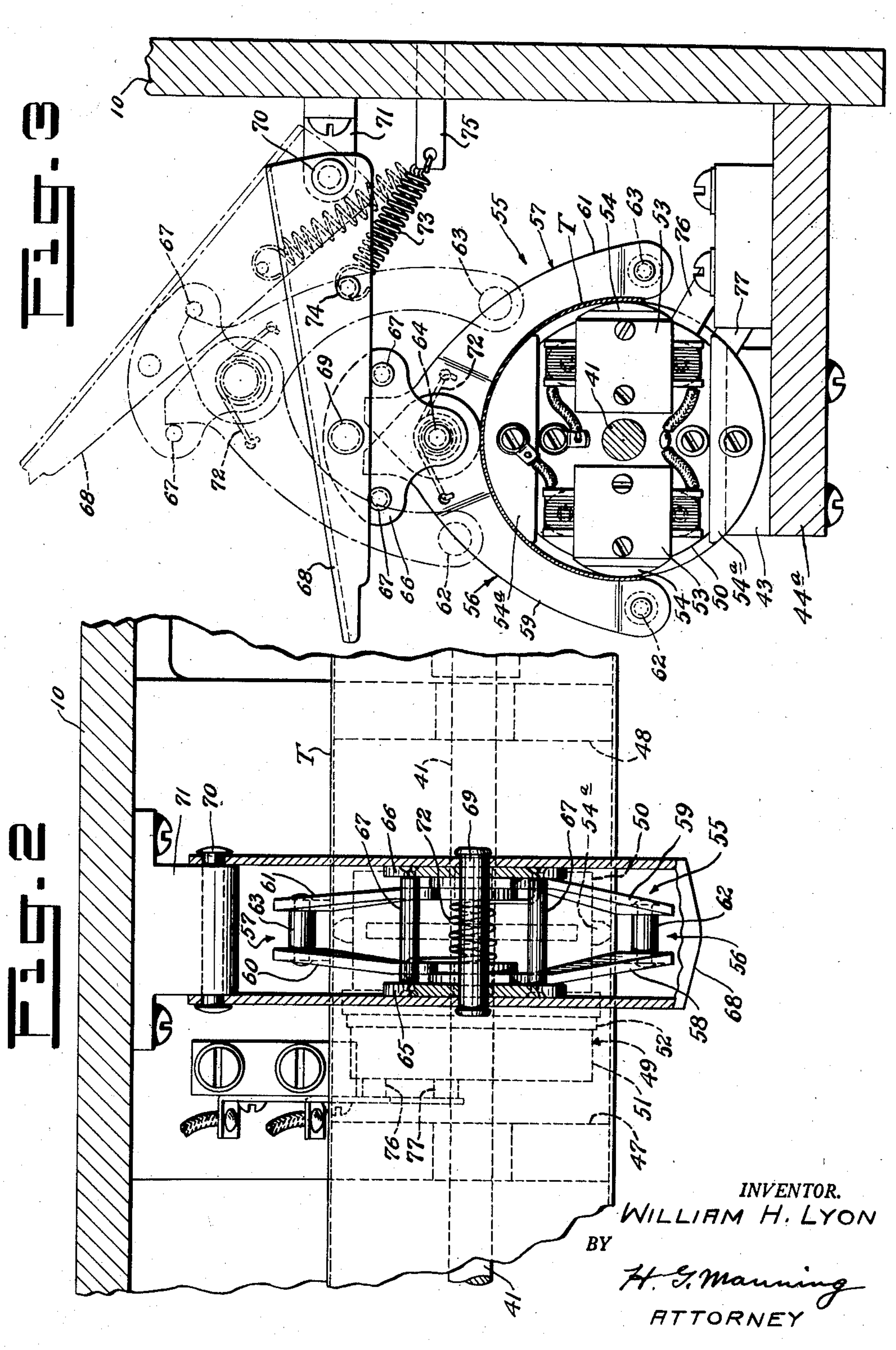

In the drawings,

Fig. 1 represents a front elevation of one form of recording and reproducing apparatus using magnetic tape embodying the present invention, Fig. 2 is a horizontal cross-sectional view of the yieldable tape pressure shoe mechanism, taken along the line 2—2 of Fig. 1, Fig. 3 is a vertical cross-sectional view, taken along the line 3—3 of Fig. 1, illustrating the yieldable tape pressure shoe mechanism in operating position, and, in broken lines, in withdrawn position, and Fig. 4 illustrates a fragmentary portion of a magnetic tape used with the foregoing apparatus and indicating the disposition of the interrupted parallel magnetic paths successively scanned by the transducers of the rotating transducer means for providing a single channel of intelligence.

Referring now to the drawing, in which like reference numerals denote corresponding parts throughout the several views, the numeral 10 indicates a chassis plate upon which the remainder of the apparatus is mounted. At the left-hand end of the chassis plate 10, a feed reel 11 containing the unused portion of a magnetic tape T is mounted on a spindle 12, and held in place thereon by a combination handle and clamp 13.

The tape T after leaving the feed reel 11 passes under a tape guide spindle 14 and is drawn through the transducing means, indicated generally at 15, by means of a feed roller 16 carried on a shaft 17, after which the tape T goes to a take-up reel 18 which is removably attached to a shaft 19 by means of a combination handle and clamp 20.

The frictional contact between the tape T and the feed roller 16 is assisted by a spring urged pressure roller 21 mounted on an arm 22 which swings about a pivot 23.

Power to drive the apparatus is furnished by a motor (not illustrated) supported at the rear of the chassis plate 10. The motor drives a stub shaft, journalled in the chassis 10, through a flexible coupling (not illustrated). The stub shaft is provided with a worm gear 24 disposed in operative engagement with a gear 25 fixed on a shaft 26. Details of the motor drive mechanism, which forms no part of the present invention, are described in my co-pending application Serial No. 562,721, filed February 1, 1956, entitled "Rotary Magnetic Transducer Means Having Yieldable Heads."

The shaft 26 is supported on the chassis plate 10 by bearings 27 and 28, and is also provided with a feed roller driving worm 29 disposed in operative engagement with a gear 30 attached to one end of a shaft 31, which is journalled in the chassis plate 10, and provided at its other end behind said chassis with a gear 32. The shaft 17 which carries the feed roller 16 is also journalled in the chassis plate.

The shaft 17 also has a driving gear 33 fixed at its end, behind the chassis plate 10. The gear 33 is driven by a tuning gear 34 which also meshes with the gear 32. The tuning gear 34 is rotatably mounted on a tuning plate 35, which in turn is swingably supported on the shaft 17.

The position of the tuning plate 35 is controlled by means of a tuning lever 36 located at the front of the apparatus and attached to a shaft 37 journalled in a bearing secured to the chassis plate 10. At the rear end of the shaft 37 provision is made of an eccentrically mounted pin 38 which bears against a projection 39 on the tuning plate 35. A coil spring 40, which is connected between the chassis plate 10 and the projection 39, tends to urge the tuning plate 35 in one direction, the movement of said plate being limited by the engagement between the projection 39 and the eccentric pin 38.

The construction just described permits manual synchronization of the tape T and the transducer means 15, and is similar to an arrangement disclosed and claimed in my co-pending application Serial Number 406,517, filed January 27, 1954, now Patent Number 2,845,495 granted July 29, 1958, entitled "Transverse Interrupted Track Magnetic Recorder With Transducer Head Drum on Horizontal Axis."

The take-up reel shaft 19 carries a pulley (not illustrated), loosely mounted thereon, and connected to the shaft 19 by a friction clutch means which permits the pulley to over-run the shaft 19 in order to insure that no slack will accumulate in the tape T between the take-up reel 18 and the feed roller 16, regardless of the amount of tape on the reel 18. The pulley on the shaft 19 is driven by a belt from a take-up reel driving pulley mounted on the shaft 17. The above-described take-up reel drive mechanism forms no part of the present invention. For a detailed illustration and description of this mechanism, however, reference can be had to my first above-mentioned application, Serial No. 562,721.

Referring now to Fig. 1 of the drawing, it will be seen that the transducer means 15 includes a longitudinally extending head wheel shaft 41 supported at one end on the chassis plate 10 by means of a bearing 42, and at its other end by bearing supports 43 and 44, forming part of a horizontal mounting plate **44*a*, attached to the vertical chassis plate 10**.

The shaft 41 is driven by the shaft 26 by means of a flexible coupling 45, and is provided with a flywheel 46 which, by effectively filtering out flutter and disturbances caused by the gears and driving system, provides a uniformly constant rate of rotation for the transducing means 15.

The upper portion of the bearing supports 43 and 44 are provided with semi-cylindrical surfaces 47 and 48 respectively, disposed in alignment with each other, and substantially in the direct path taken by the tape T as it moves between the tape guide spindle 14 and the feed roller 16.

Secured to the head wheel shaft 41 between the bearing supports 43 and 44, is a transducer head wheel generally indicated by the numeral 49. The head wheel 49 comprises a disk 50, the left-hand side of which (with reference to Fig. 1) is fitted with a pair of concentric slip rings 51 (only the outer slip ring being visible), insulated from said disc 50 by an insulating disk 52.

Fixed against the left-hand side of the head wheel disc 50 (Fig. 3) and diametrically opposed to one another are a pair of identical magnetic transducer heads 53 having rounded, outwardly-extending pole pieces 54. A pair of concentric sound ring segments **54*a*, having openings through which the pole pieces 54 slightly protrude, are fixed with respect to the head wheel disc 50. The radial distance of the pole pieces 54 from the axis of rotation of the shaft 41 is substantially equal to the radius of curvature of the aligned semi-cylindrical surfaces 47, 48 of the bearing supports 43, 44. For a more detailed description of the head wheel 49**, reference can be made to my above-mentioned co-pending application Serial No. 406,517.

By means of the yieldable tape pressure shoe mechanism now to be described, the tape T will be constantly maintained in contact with the pole pieces 54 and the sound ring segments, over the entire arcuate width of the tape T during rotation of the head wheel disc 50.

The pressure shoe mechanism, generally indicated by the numeral 55 (Fig. 3) comprises a forward pressure shoe 56 and a rear pressure shoe 57. Each pressure shoe 56, 57 is constructed of two curved members 58, 59 and 60, 61, respectively, rigidly attached to each other at their lower ends as by respective rivet pins 62, 63, said curved members being so arranged that the pressure shoes 56, 57 provide a varying width groove over the sound track area. Thus the groove is narrow at the edges of the tape, where the tape rigidity is small, and is wide near the center of the tape where the tape rigidity is strong. The two sides of each pressure shoe 56, 57 conform accurately to the outer circumference of the tape when it is in close contact with the sound ring segments **54*a*, and one or the other of the pole pieces 54. The pressure shoes 56 and 57 are pivoted together in the center and directly over the center line of the tape T by a pivot pin 64. The pivot pin 64 is secured in a bracket formed of side members 65 and 66 interconnected by a pair of pins 67, 67. The bracket side members 65, 66 are centrally pivoted at their upper ends to a movable support lever 68 by means of a transverse pin 69. The inner end of the support lever 68 is pivotally secured, by means of a transverse pin 70, to a bracket 71 secured against the chassis plate 10**.

The pivoted movable support lever 68 permits the pressure shoes 56 and 57 to be lifted from the back of the tape T and from the head wheel 49 so that removal and replacement of the tape can be easily accomplished. A torsion spring 72 surrounds the pivot pin 64 at the pivot point of the pressure shoes 56, 56, the ends of said spring being engaged in openings in the respective pressure shoe curved members 59 and 60 and being constrained to urge the pressure shoes toward the tape and toward the axis of the head wheel 49.

Inward movement is limted (as can best be seen in the brokenline representation in Fig. 3) by virtue of the upper end portions of the curved members 58, 59 and 60, 61 of the pressure shoes 56, 57 abutting the respective pins 67.

A tension spring 73 is provided for effecting downward pressure of the pressure shoe mechanism 55 against the center of the tape T, said spring being secured between a pin 74, fixed to the support lever 68 at a location between the pivot pins 69 and 70 thereof, and a drilled stud 75 fixed in the chassis plate 10 at a point below the bracket 71. Good contact between the transducer head pole pieces 54 and the tape T as they move relative to one another is thus assured.

In the apparatus shown, the transducer heads 53 are connected in series with each other and with the two slip rings 51. The electrical connections to the slip rings are made by means of a pair of brushes 76 and 77 respectively (see Fig. 2).

*Operation*

To use the above-described apparatus either for recording or reproducing intelligence, the first step is to raise the pressure shoe mechanism 55 to the dotted line position shown in Fig. 3.

The feed roll 11 containing unused magnetic tape T will then be placed on the spindle 12 and secured by means of the handle clamp 13, after which the tape T is led around and under the spindle 14 through the transducer means 15, passing the tape over the semi-cylindrical surfaces 47 and 48 and under the tape pressure shoe mechanism 55 to the feed roller 16, the pressure roller 21 being moved to the right to allow the insertion of the tape therebetween.

The tape is then connected to the hub of an empty take-up reel 18. The tape holding shoe mechanism 55 will then be lowered to the position as shown in solid lines in Fig. 3, and current may then be supplied to the drive motor (not illustrated) to begin operation. In order to record intelligence on the tape T, no further adjustment will be necessary.

Operation of the drive motor will produce rotation of the shaft 31 and the head wheel shaft 41 in a counter-clockwise direction as viewed in Fig. 3. Rotation of the shaft 31 will produce counter-clockwise rotation (as viewed in Fig. 1) of the feed roller 16, through the medium of the gears 32, 34 and 33.

At the same time, the take-up reel 18 will also be caused to move in a counter-clockwise direction. However, while the drive motor, and consequently the feed roller 16, are intended to rotate at a uniform rate of speed, the rotation of the take-up reel will vary in accordance with the amount of tape T which has accumulated thereon. The purpose of the above-mentioned friction clutch means is to accommodate this variation, as is well understood in the art. At the same time, rotation of the head wheel shaft 41 will turn the magnetic transducer head wheel 49 to cause the transducer heads 53 to make successive sweeps across the width of the tape T in a counter-clockwise direction as viewed in Fig. 3, it being understood that as one of the transducer heads 53 on the transducer head wheel 49 is about to leave the lower left-hand edge of the tape T as viewed in Fig. 3, the other of the heads 53 will begin its sweep at the right-hand edge of the tape T. Successive parallel magnetic paths are thus scanned by the two revolving magnetic heads 53 as indicated at A in the segment of tape T shown in Fig. 4.

It is to be understood that while the invention disclosed herein is shown with only a single rotating transducing means or head wheel 49, additional transducer means can readily be employed to provide additional channels of communication. My co-pending application, Serial No. 538,151, filed October 3, 1955, entitled "Head Drum Assembly for Magnetic Tape," fully described how the axial spacing between the pole pieces of a plurality of transducer means, as measured along the length of the tape T may be arranged so that their transverse magnetic paths across the tape will be interspaced.

The two-piece yielding pressure shoe mechanism comprising the present invention, besides being simple, as compared with prior devices for maintaining uniform pressure between the tape and the transducer pole shoes of a long playing magnetic recorder device of the type herein described, also requires a minimum amount of space, and, being unusually narrow, is therefore particularly well suited for use with a plurality of transducer means or head wheels located close together on a common revolving axle. This is of special advantage in multiple channel recording machines, or in machines where it is required that the playback heads be located close to the recording heads.

Whenever it is desired to reproduce intelligence which has been recorded on the tape T, the procedure for threading the tape T through the transducer means 15 and the feed roller 16 is the same as when it is to be recorded on the tape T, the tape moving as before from the feed reel 11 to the take-up reel 18. However, due to the fact that the magnetic paths A have previously been established at pre-determined intervals along the length of the tape T, it is necessary that the proper phase relationship be established between the longitudinal movement of the tape T produced by the feed roller 16 and the transverse movement of the individual transducer heads 53, so that as each of the heads 53 reaches the right-hand edge of the tape T as viewed in Fig. 3, the appropriate magnetic path will be positioned in axial alignment therewith.

This phase relationship can be quickly and easily established manually by means of the tuning gear 34, which, when its axis is shifted by rotation of the tuning plate 35 about its pivot arm shaft 17, will cause a corresponding increase or decrease in the speed of rotation of the feed roller 16, until synchronism has been established between the movement of the heads 53 and their respective paths A (Fig. 4). Once this synchronism has been established, the position of the tuning gear 34 may be left unchanged. Adjustment of the tuning gear 34 is accomplished by means of the tuning lever 36, the rotation of which will cause the eccentric pin 38 to shift the tuning gear 34 by engagement with the projection 39. The tuning mechanism just described is also disclosed and claimed in my above mentioned co-pending application, Serial Number 406,517, now Patent Number 2,845,495, which forms no part of the present invention.

While there has been disclosed in this specification one form in which the invention may be embodied, it is to be understood that this form is shown for the purpose of illustration only and that the invention is not limited to this specific disclosure but may be modified and embodied in various other equivalent forms without departing from its spirit. In short, the invention includes all the modifications and embodiments coming within the scope of the following claims.

Having thus fully described the invention, what is claimed as new, and for which it is desired to secure Letters Patent is:

1. In a sound recorder, the combination comprising a pair of transducer heads each having a member adapted for operation with a flexible tape recording medium, means to mount said transducer heads for rotation about a common axis, said operative members being disposed in diametrically opposed relationship, means to resiliently hold said flexible tape in an arcuate configuration for engagement with said operative members during said rotation, said tape holding means comprising a pair of arcuate pressure shoes, a pivot pin disposed above said common axis, each pressure shoe comprising a pair of spaced curved members having arcuate edges operative to contact said tape, said curved members of each of said shoes being arranged at opposite sides of said operative members, each pressure shoe being pivoted at one end to said pivot pin, and means operative to resiliently urge the other ends of said pressure shoes towards one another about said pivot pin to permit radial motion thereof with respect to said operative members during operative engagement with said tape.

2. The invention as defined in claim 1, wherein said resiliently urging means comprises a torsion spring circumjacent said pivot pin and having its ends secured to one each of said pressure shoes.

3. The invention as defined in claim 1, including means to limit the resilient urging of the other ends of said pressure shoes towards each other.

4. The invention as defined in claim 1, including supporting means resiliently mounting said pivot pin in the outward direction with respect to said common axis.

5. The invention as defined in claim 4, wherein said supporting means comprises a bracket, a housing structure, means swingably mounting said housing structure at one end of said bracket, said pivot pin being supported in said housing structure, and a second pivot pin fixed with respect to said axis, the other end of said bracket being pivotally journalled to said second pivot pin.

6. The invention as defined in claim 5, including a torsion spring having one end secured to said bracket at a position between said housing structure and said second pivot pin, and its other end fixed with respect to said axis.

7. The invention as defined in claim 1, wherein each of said spaced pair of arcuate members is held in decreasing spaced relation from said one end to said other end of its respective pressure shoe.

References Cited in the file of this patent

UNITED STATES PATENTS

| | | |
|---|---|---|
| 1,857,130 | Alexanderson | May 10, 1932 |
| 2,245,286 | Marzocchi | June 10, 1941 |
| 2,567,307 | Wise | Sept. 11, 1951 |
| 2,648,589 | Hickman | Aug. 11, 1953 |
| 2,773,120 | Masterson | Dec. 4, 1956 |